United States Patent [19]
Noel

[11] 3,961,912
[45] June 8, 1976

[54] MACHINE FOR ASSEMBLING REELS AND THE LIKE

[75] Inventor: Roane C. Noel, Orange, Calif.

[73] Assignee: The Wickes Corporation, Del.

[22] Filed: Jan. 9, 1975

[21] Appl. No.: 539,638

[52] U.S. Cl. .............................. 29/200 P; 29/200 R; 242/118.4; 113/1 L
[51] Int. Cl.² ......................................... B23P 19/00
[58] Field of Search ........... 29/200 R, 200 A, 200 J, 29/200 P; 113/1 L; 242/118.4, 118.6

[56] References Cited
UNITED STATES PATENTS

| | | |
|---|---|---|
| 2,415,941 | 2/1947 | Edson et al. ...................... 29/200 A |
| 3,186,095 | 6/1965 | Woodruffe-Peacock ...... 29/200 J X |
| 3,624,886 | 12/1971 | Powers et al. .................. 29/200 P X |

*Primary Examiner*—Victor A. DiPalma
*Attorney, Agent, or Firm*—Huebner & Worrel

[57] ABSTRACT

A machine for assembling reels and the like having a conveyor adapted to transport a predetermined number of segments disposed in side-by-side relation to an assembly position, a pair of substantially circular guide frames mounted in substantially coaxial alignment transversely of the conveyor in the assembly position in receiving relation to segments borne by the conveyor, and a mechanism for retention of the segments in side-by-side relation and in engagement with the guide frames to cause the segments to assume a substantially cylindrical configuration within the guide frames.

23 Claims, 20 Drawing Figures

MACHINE FOR ASSEMBLING REELS AND THE LIKE

BACKGROUND OF THE INVENTION

The present invention relates to a machine for assembling structures composed, in part, of a plurality of segments and more particularly to such a machine which is adapted to assemble reels of the type used in storing and handling utility cable wherein the reels have substantially cylindrical central portions, composed of a plurality of substantially uniform, transversely arcuate segments and lateral flange portions secured in engagement with the ends of the segments.

Reels of a variety of types used in storing and handling utility cables, power lines, telephone lines and the like have, in the past, required manual assembly due to the manipulations needed to retain the unwieldy segments, or staves, in a cylindrical configuration to permit attachment of flange portions thereto. The plurality of staves must be arranged and united in a contiguous cylindrical configuration with the flange portions abutting the ends of the staves and held together by bolts interconnecting the flange portions extending through the interior of the cylindrical portion. Such manual assembly is extremely slow, tedious and is capable of producing only about six units per man hour at best. While the manual construction of reels has, in the past, been feasible if unsatisfactory, the increasing demand for reels coupled with the rapid increase of labor costs, has made such conventional manual methods of construction increasingly impractical.

No existing mechanical contrivance, of which the applicant is aware, is capable of assembling such reels. The prior art patents such as the Bureau U.S. Pat. No. 1,673,040 and the Wilson et al U.S. Pat. No. 2,995,810 relate primarily to reel construction of a character dissimilar to that employed in the industry. An additional impediment to the development of a machine for such assembly is the difficulty of designing such a machine which permits ready adjustment for the assembly of reels of varying sizes and proportions. This is a necessary adjunct to a commercially acceptable machine because of the profuse variety of sizes of reels required by industry.

Therefore, it has long been recognized that it would be desirable to have a machine which possesses the capability of vastly increasing the number of such reels which can be assembled in a given period of time with only a minimum of manual assistance so as significantly to reduce the cost per unit and which can conveniently be adjusted to assemble structures of varying sizes and proportions.

SUMMARY OF THE INVENTION

It is therefore an object of the present invention to provide a machine for assembling structures, such as reels, composed of a plurality of segments.

Another object is to provide such a machine which is adapted semi-automatically, rapidly and precisely to position a plurality of segments in a contiguous preselected configuration.

Another object is to provide such a machine which is adapted to arrange the segments in the preselected configuration while such segments are still in a random and unattached condition.

Another object is to provide such a machine which is adapted to arrange a plurality of substantially uniform, transversely arcuate segments in a contiguous substantially cylindrical configuration prior to assembly to create the cylindrical portion of a reel.

Another object is to provide such a machine which restrains the segments against gravitational displacement from the predefined configuration to permit attachment of side flanges completing the reel.

Another object is to provide such a machine which operates automatically to form the predefined cylindrical configuration with a minimum of mechanical manipulation and wherein a first segment of the plurality of segments drops into position in side-by-side relation to a last segment upon the last segment reaching a predefined position thereby completing the cylindrical configuration.

Another object is to provide such a machine which automatically shuts off following formation of the preselected cylindrical configuration.

Another object is to provide such a machine which is operable to position flange portions forming parts of the reel in endward engagement with the segments to permit securing of the flanges on the cylindrical portion formed by the prearranged segments.

Another object is to provide such a machine which is readily adjusted without extensive manual effort to permit the assembly of reels of differing lengths and diameters and having cylindrical portions of varying sizes.

Another object is to provide such a machine which possesses the capability of vastly increasing the numbers of reels which can be assembled in a given period of time.

A further object is to provide such a machine which permits the assembly of reels as presently used in the industry in their preferred form.

A still further object is to provide such a machine which permits the construction of reels as structurally sound and durable as those conventionally by manual assembly, but with greater consistency of result.

Further objects and advantages are to provide improved elements and arrangements thereof in a machine for the purposes described which is dependable, economical, durable and fully effective in accomplishing its intended purposes.

DESCRIPTION OF THE PREFERRED EMBODIMENT

Figures 1, 19:
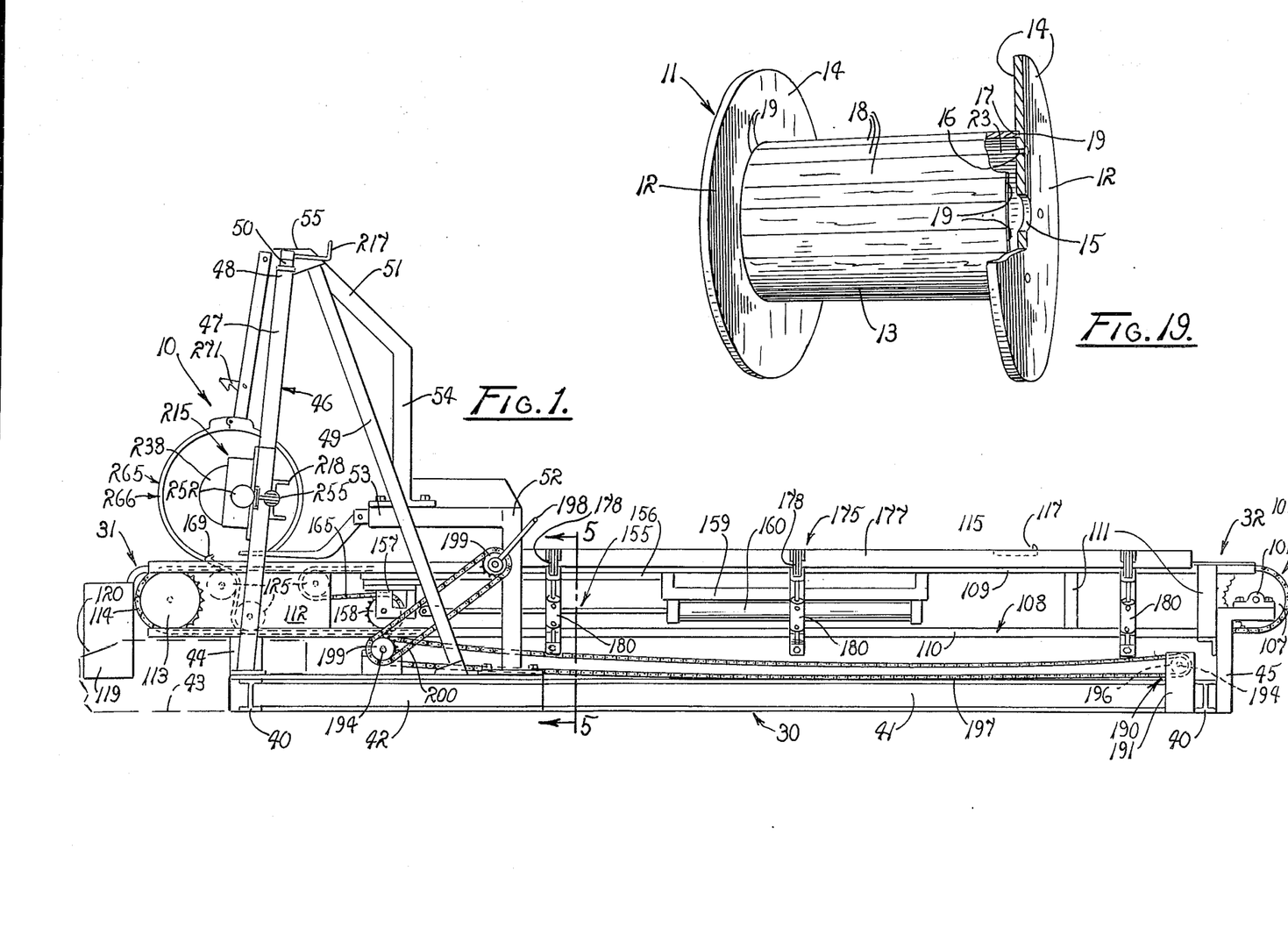
FIG. 1 is a side elevation of the machine of the present invention.
FIG. 19 is a fragmentary perspective view of an assembled reel.

Referring more particularly to the drawings, the machine of the present invention is generally indicated by the numeral 10 in FIG. 1. The machine is adapted, as will be seen, to assemble reels 11 of the type shown in FIG. 19. Although it will become apparent that the machine could be adapted for the assembly of a variety of types of structures composed of a plurality of segments as well as reels of different forms of construction, the machine is primarily designed to assemble reels of the type shown in FIG. 19 composed generally of a pair of spaced circular, substantially coaxial members flange portions or flanges 12 interconnected by a cylindrical portion 13 in substantially coaxial alignment with the flanges.

Each flange 12 of the reel 11 has opposite sides 14 and a central retaining opening 15 extending therethrough. A plurality of bolt holes 16 are extended through each of the flanges in corresponding positions, the holes of each flange defining a pattern spaced from the retaining opening a predetermined distance. A predetermined side 14 of each flange has a circular groove 17 therein substantially concentric to and about the retaining opening.

The cylindrical portion 13 of reel 11 is composed of a plurality of elongated elements, segments or staves 18. Each of the staves has opposite ends 19 and opposite sides 20. As can best be seen in FIG. 8, each stave has a concave surface 21 and an opposite convex surface 22.

With the reel 11 in assembled form, the staves 18 are positioned in side-by-side abutting relation with the convex surfaces 22 thereof facing outwardly to assume the configuration of the cylindrical portion 13 of the reel. The opposite ends 19 of the staves are fully received in the circular grooves 17 of the flanges 12. The cylindrical portion and opposite flanges are held in the described assembled relationship by a plurality of bolt and nut assemblies 23 extended through the bolt holes 16 so as to interconnect the flanges and bind them into engagement with the opposite ends of the staves.

The machine 10 has a main frame 30 having a front portion 31 and a rear portion 32. The main frame is composed of a first sub frame 33 and a second sub frame 34.

Figures 3, 7, 8:
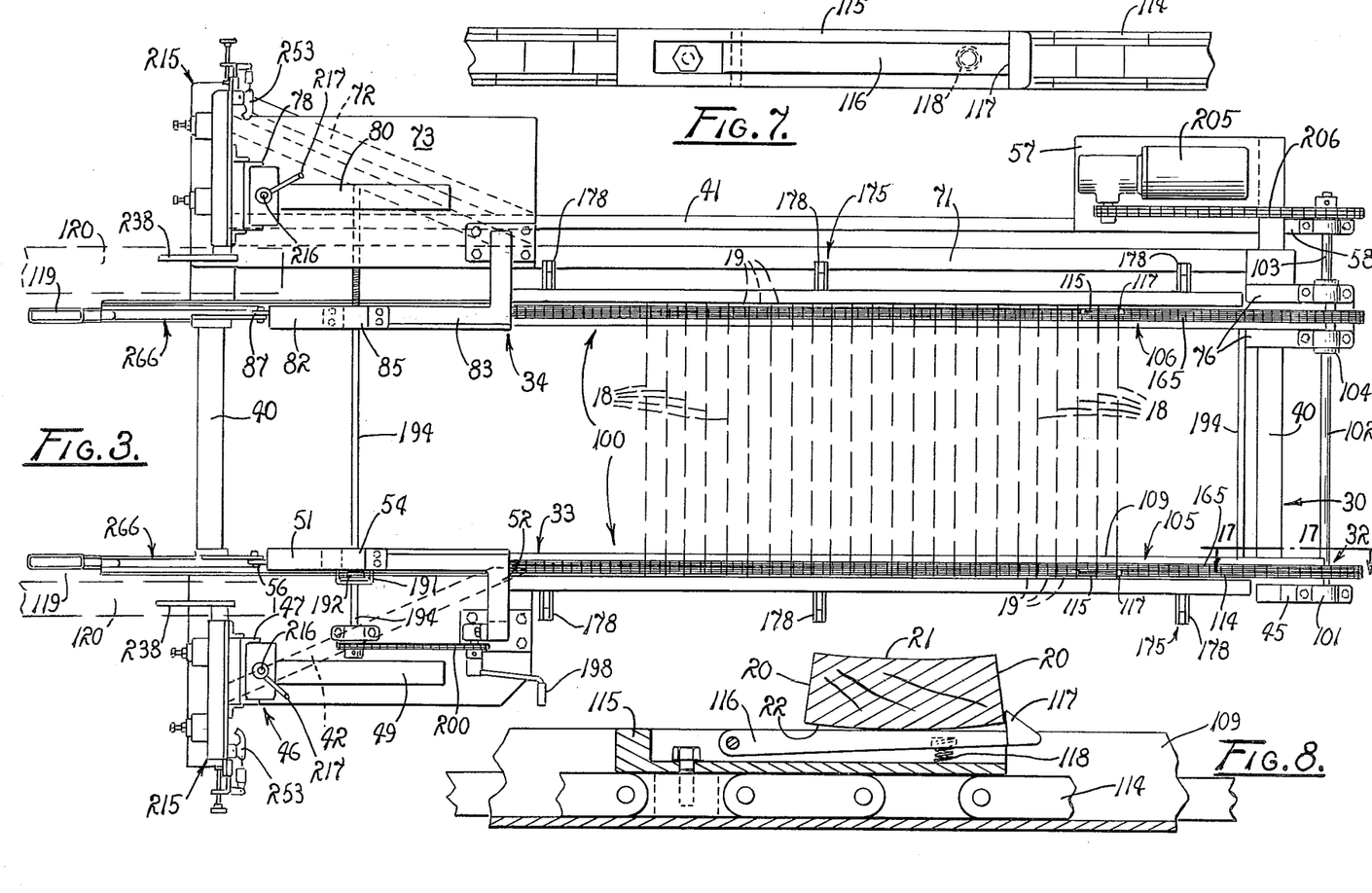
FIG. 3 is a top plan view of the machine.
FIG. 7 is a somewhat enlarged fragmentary top plan view of a pusher arm of the machine.
FIG. 8 is a fragmentary longitudinal vertical section taken on line 8—8 in FIG. 7.

As can best be seen in FIG. 3, the first sub frame 33 has a pair of transverse I beams 40 extending in substantially parallel relation transversely of the main frame individually adjacent the front and rear portions of the main frame. The transverse I beams are interconnected by a pair of spaced, longitudinal I beams 41. The I beams 40 and 41 are adapted for rested engagement on a ground or floor surface in supporting relation to the machine. A brace 42 interconnects the transverse I beam at the front portion of the main frame and the longitudinal I beam extending diagonally therebetween, as shown in FIG. 3. A floor 43 is mounted, as by welding, on the interconnected I beams and brace extending rearwardly from the front portion 31 of the main frame. A first support 44 is borne by the floor 43 in upstanding relation adjacent to the front portion of the main frame. A second support 45 is secured in upstanding relation on the transverse I beam 40 adjacent to the rear portion 32 of the main frame.

A first flange support structure 46 is mounted in upstanding relation on the floor 43 of the first sub frame 33. The structure is composed of an upright beam 47, having an upper end 48, mounted in predetermined position on the floor and angled backwardly at an angle from the front portion 31 of the main frame 30, as best shown in FIG. 1. The structure also has a brace 49 interconnecting the floor and the upper end of the beam in supporting relation thereto. The upper end of the beam mounts a bearing 50 disposed to define an axis of rotation substantially parallel to the upright beam.

Figure 4:
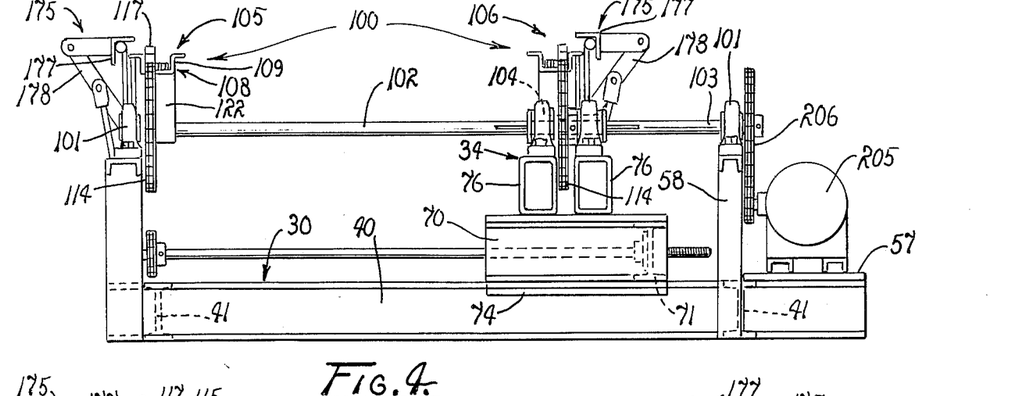
FIG. 4 is a rear elevation of the machine.

A first guide frame support structure 51 is mounted on the floor 43 of the first sub frame 33 extending generally upwardly therefrom. The frame support structure is composed of a first component 52 which is fastened on the floor extending upwardly therefrom a predetermined distance, then in right-angular relation thereto toward the longitudinal center of the main frame 30, and then in right-angular relation thereto horizontally toward the front portion 31 of the main frame to define a forward end portion 53, as can best be seen in FIGS. 1 and 3. The support structure 51 has a second component 54 secured on the forward end portion of the first component in upstanding relation and bent intermediate its ends to extend diagonally and upwardly in the general direction of the front portion of the main frame to define an upper end 55. A mounting plate 56 is fastened, as by welding, on the upper end of the second component. A horizontal motor platform 57 is mounted on the remote end of the transverse I beam 40 and on longitudinal I beam 41 adjacent to the rear portion 32 of the main frame, as best shown in FIG. 4. A bearing support is secured on the same I beam in upstanding relation adjacent to the motor platform.

Figure 6:
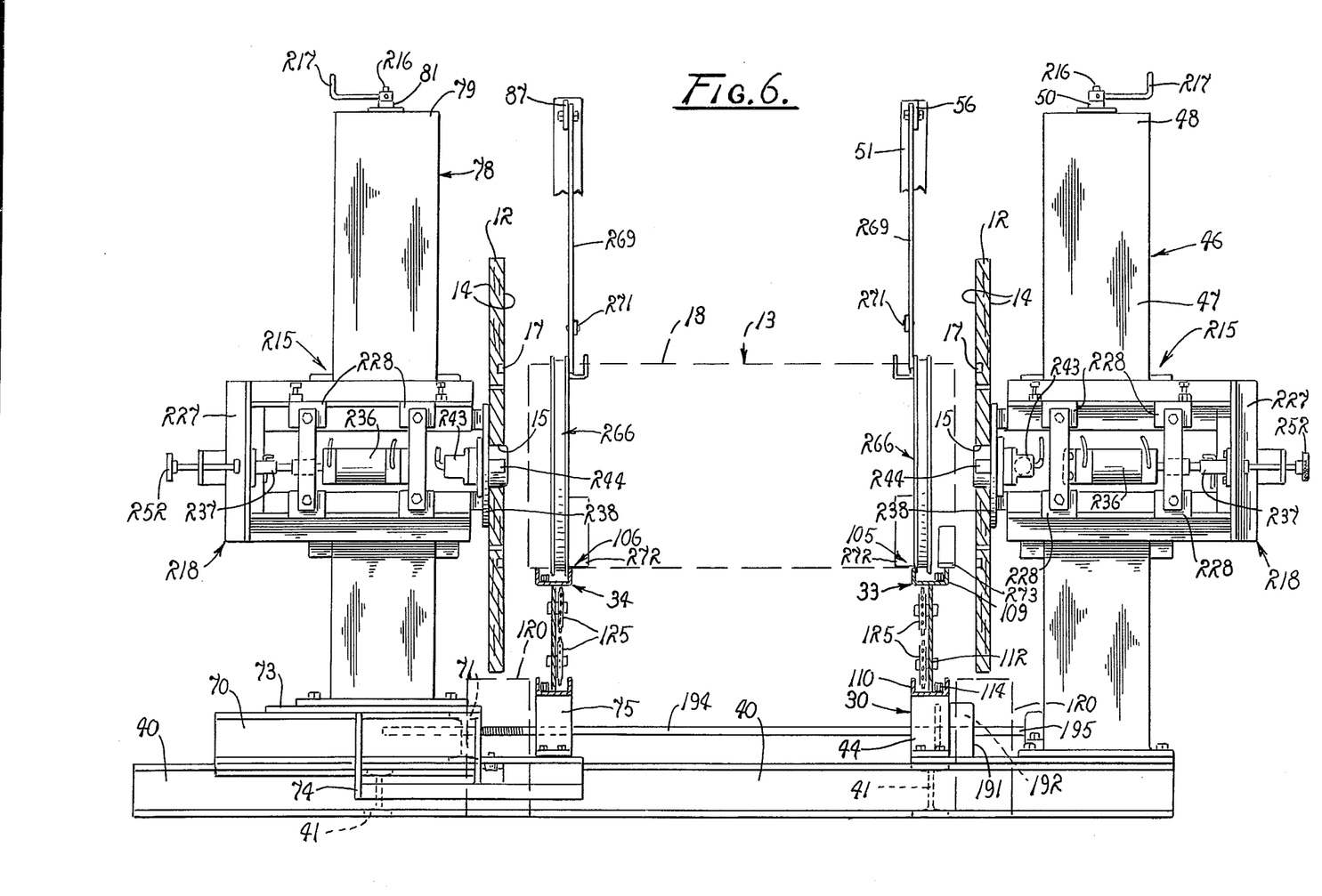
FIG. 6 is a transverse vertical section of the machine showing a pair of flanges mounted in position with a preselected cylindrical configuration shown in dashed lines.

The second sub frame 34 has a pair of transverse I beams 70 individually positioned in rested engagement on and in alignment with the transverse I beams 40 of the first sub frame 33. Wear resistant pads, not shown, can be interposed between the I beams 40 and 70 and attached to either I beam to facilitate slidable movement therebetween. The transverse I beams 70 are interconnected by a longitudinal I beam 71 retaining the transverse I beams in substantially parallel relation. A brace 72 diagonally interconnects the transverse I beam 70 adjacent the front portion 31 of the main frame 30 with the longitudinal I beam. A floor 73 is mounted on the brace and the transverse and longitudinal I beams which it interconnects, as best shown in FIG. 3. A guide assembly 74 is secured on and extends downwardly and toward the center of the machine from the floor 73 over the transverse I beam 40 nearest the front portion 31 of the main frame to guide movement of the transverse I beam 70 on transverse I beam 40. A first support 75 is mounted in upstanding relation on the guide assembly inwardly of the main frame from the transverse I beam mounting the guide assembly, as best shown in FIG. 6. A pair of spaced second supports 76 are fastened, as shown in FIG. 4, on the transverse I beam 70 adjacent to the rear portion 32 of the main frame in alignment longitudinally of the machine with the first support 75.

Figures 2, 20:
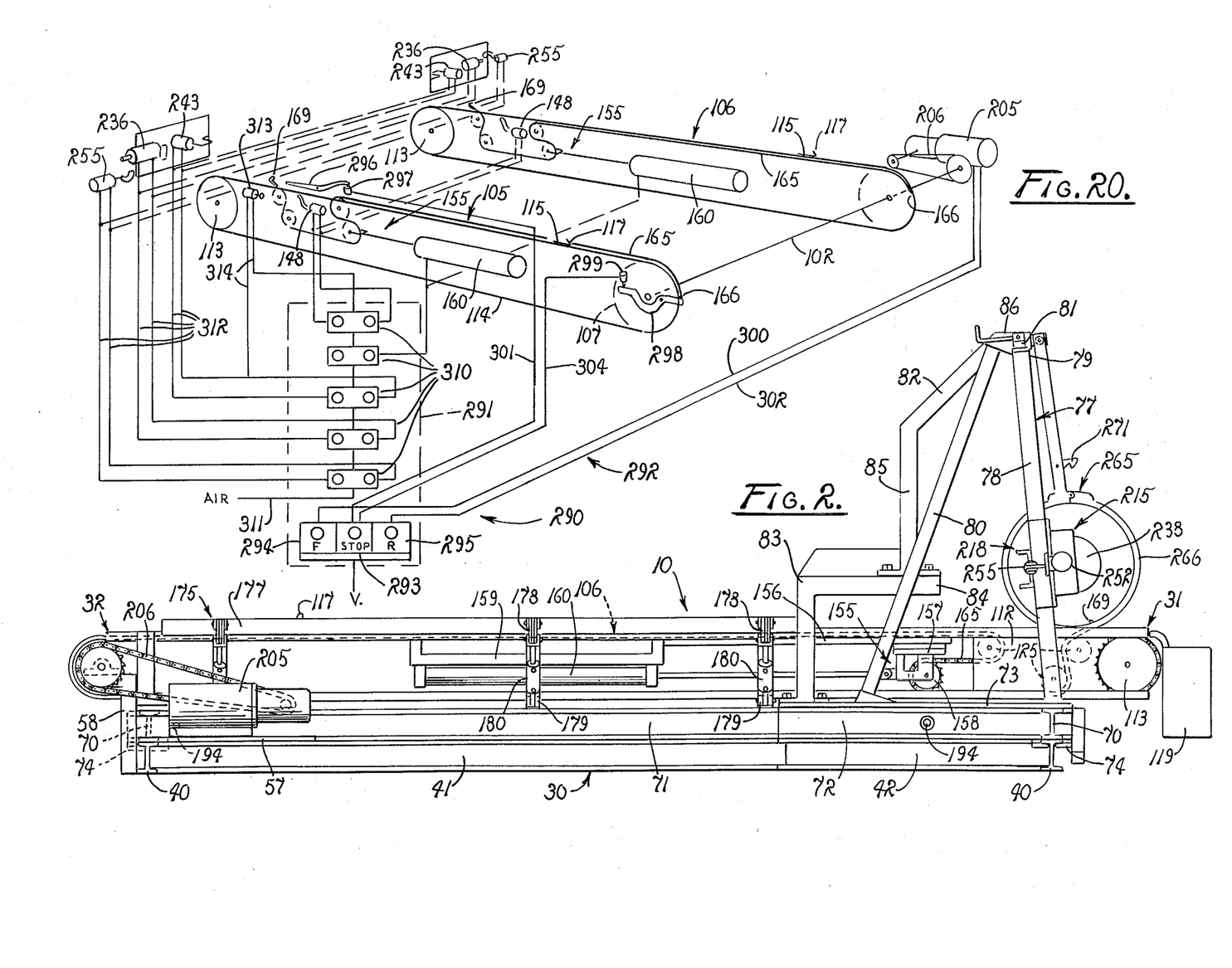
FIG. 2 is a side elevation of the opposite side of the machine from that viewed in FIG. 1.
FIG. 20 is a schematic diagram of the pneumatic and electrical systems of the machine.

A second flange support structure 77 is borne by the floor 73 of the second sub frame 34 in upstanding relation, as best shown in FIGS. 2, 3 and 6. The second flange support structure is substantially identical to the first flange support structure 46 of the first sub frame 33, already described, with the exception that it is slightly shorter in length to compensate for the difference in elevations of the floors 43 and 73 thereby providing the support structures 46 and 77 with equivalent usable lengths, as can best be seen in FIG. 6. The support structure 77 is composed of an upright beam 78 mounted on the floor 73 extending upwardly and slightly rearwardly from the front portion 31 of the main frame at a predetermined angle corresponding to that of the upright beam 47. The upright beam has an upper end 79. A brace 80 is mounted on the floor 73 and extends upwardly in supporting relation to the upper end of the upright beam. A bearing 81 is affixed on the upper end 79 of the upright beam.

A second guide frame support structure 82, substantially identical to the first guide frame support structure 51 of the first sub frame 33, is mounted on the floor 73 extending generally upwardly and forwardly toward the front portion 31 of the main frame 30. As previously described with respect to flange support structure 77, guide frame support structure 82 is of slightly shorter actual length than first guide frame support structure 51 to compensate for the difference in elevations of the floors 43 and 73 thereby providing support structures 51 and 82 with equivalent usable lengths. Structure 82 is composed of a first component 83 extending upwardly from the floor 73, then inwardly substantially horizontally toward the center of the main frame, and subsequently horizontally toward the front portion 31 of the main frame to define a forward end portion 84, as best shown in FIGS. 2 and 3. A second component 85 is mounted on the forward end portion 84 of the first component extending substantially upwardly and forwardly toward the front portion of the main frame to define upper end 86 therefor. A mounting plate 87 is fastened on the upper end 86 of the second component in substantially horizontal alignment with the mounting plate 56.

Thus, it will be seen that the second sub frame 34 and all of the operative components of the machine 10 supported thereon, are in turn supported on the pair of transverse I beams 40 of the first sub frame 33 to permit movement of the second sub frame toward and from the corresponding component of the first sub frame.

A receiving station or conveyor assembly for the machine 10 is generally indicated by the numeral 100 in FIGS. 1, 2 and 3. The conveyor assembly has four rear conveyor bearings 101 individually mounted in coaxial alignment transversely of the machine on the supports 45 and 58 and the pair of supports 76 respectively, as shown in FIG. 4. A drive shaft 102 is rotationally received in the bearings 101 borne by supports 45 and 58 and has a drive end portion 103 extending to a position rearwardly adjacent to the motor platform 57. A drive sleeve 104 is received on the drive shaft for slidable movement longitudinal thereof. The sleeve is keyed to the shaft for rotational movement with the drive shaft and is rotationally received in the bearings 101 borne by the supports 76.

Figures 9, 15, 16:
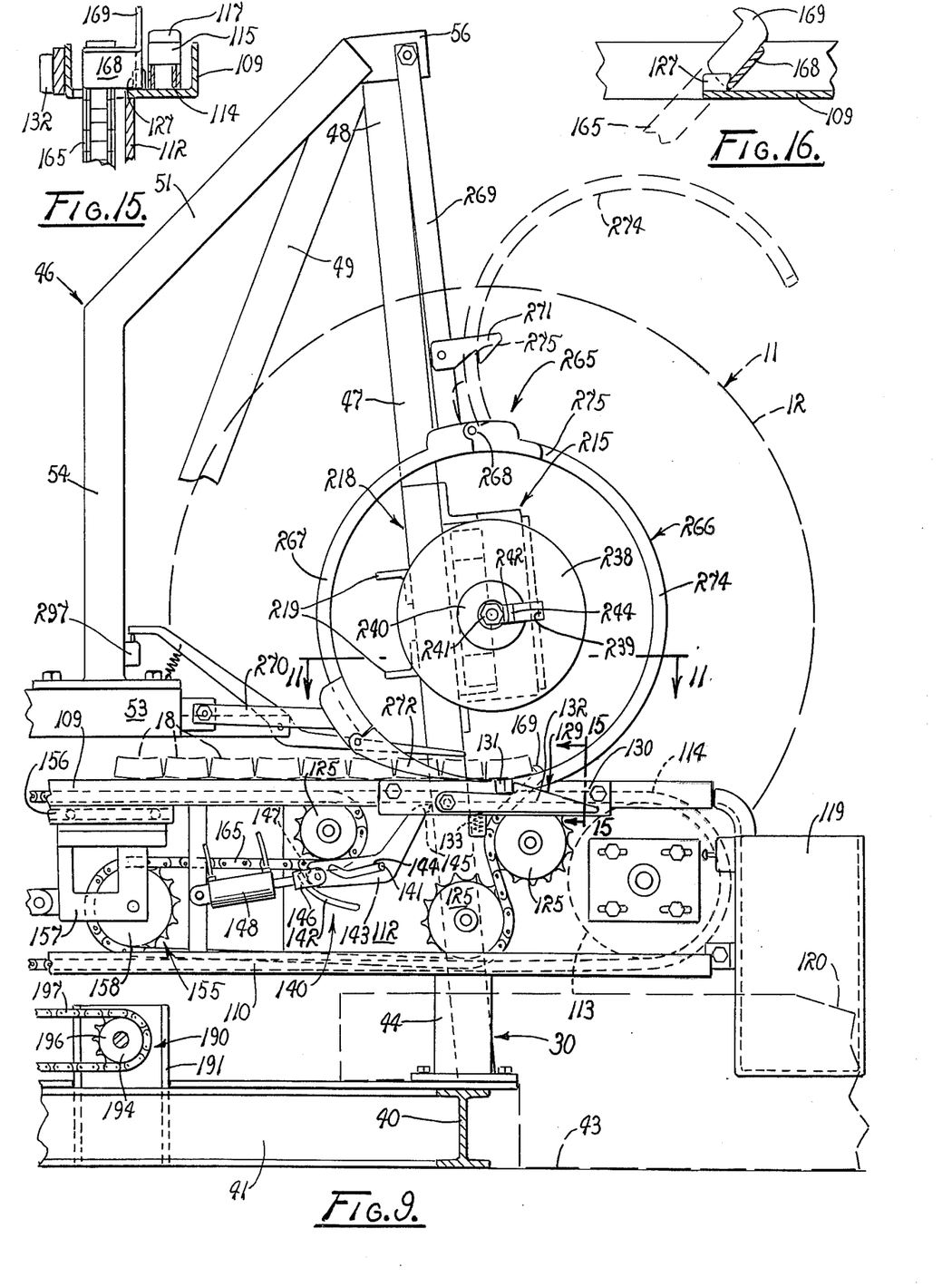
FIG. 9 is a somewhat enlarged fragmentary longitudinal vertical section taken on line 9—9 in FIG. 3.
FIG. 15 is a fragmentary transverse vertical section taken from a position indicated by line 15—15 in FIG. 9.
FIG. 16 is a fragmentary longitudinal vertical section taken from a position indicated by line 16—16 in FIG. 15.

The conveyor assembly 100 is composed of first and second conveyors 105 and 106 respectively. The first conveyor 105 is mounted on first and second supports 44 and 45 respectively of the first sub frame 33 extending longitudinally of the main frame 30 interconnecting the front and rear portions 31 and 32 respectively thereof, as best shown in FIGS. 1 and 2. The second conveyor 106 is mounted on supports 75 and 76 of the second sub frame 34 extending longitudinally of the main frame parallel to the first conveyor, as best shown in FIGS. 2 and 3. The conveyors 105 and 106 are of substantially identical construction, except that they are substantially mirror images of each other, and for descriptive convenience will be described together. Each of the conveyors has a drive sprocket 107 mounted for rotation with the drive shaft 102. The drive sprocket of the first conveyor is affixed directly on the drive shaft adjacent to the bearing 101 on the left as viewed in FIG. 4. The drive sprocket of the second conveyor is mounted on the drive sleeve 104 between the adjacent bearings 101 borne by the supports 76. Each of the conveyors has a conveyor frame 108 composed of an upper track 109 and a downwardly spaced substantially parallel lower track 110 interconnected in structurally rigid relation by a plurality of frame members 111. Each frame 108 is endwardly aligned with its respective drive sprocket 107, as can be seen in FIG. 3. Each conveyor has a front sprocket mounting plate 112 secured on and interconnecting the upper and lower tracks adjacent to the front portion 31 of the main frame 30, as best shown in FIG. 9 with respect to the first conveyor. A conveyor idler sprocket 113 is rotationally mounted on the plate 112 of each conveyor between and in alignment with the upper and lower tracks thereof. A conveyor chain 114 is operably extended about the drive sprocket 107 and idler sprocket 113 of each conveyor 105 and 106 respectively.

Figures 5, 17, 18:
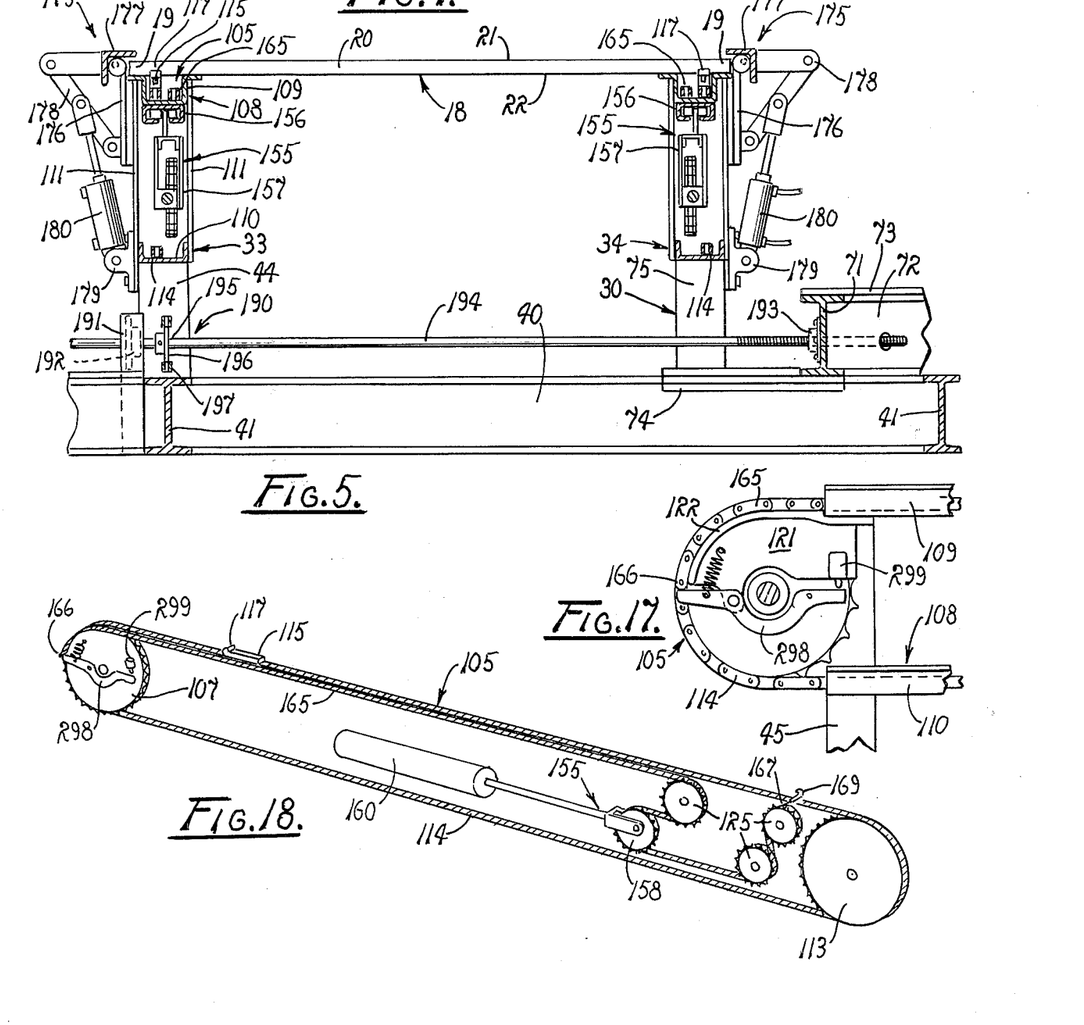
FIG. 5 is a transverse vertical section taken on line 5—5 in FIG. 1.
FIG. 17 is a fragmentary longitudinal vertical section taken from a position indicated by line 17—17 in FIG. 3.
FIG. 18 is a schematic illustration of a portion of the conveyor assembly of the machine.

A pusher arm mount 115 is individually fastened on the conveyor chain 114 of each conveyor 105 and 106 respectively in alignment substantially transversely of the machine 10. Each mount has a pusher arm 116 mounted for pivotal movement thereon. Each arm has a hook 117 at the remote end thereof resiliently urged into upwardly extended relation by a compression spring 118 extending between the mount and the arm, as best shown in FIG. 8. A chain box 119 is secured on the upper and lower tracks 109 and 110 respectively of each conveyor at the front portion 31 of the main frame 30, as shown in FIG. 9. A pair of ramps 120 are adapted to be positioned beneath and extending in front of the front portion of the main frame. The ramps are intended to be located in position, as shown in FIG. 6, to receive the flange portions 12 of an assembled reel 11 to permit the reel to be rolled from the machine. A mounting plate 121 is affixed on the upper and lower tracks of the first conveyor at the rear portion 32 of the main frame, as shown in FIG. 17. The mounting plate has an arcuate track extension 122 affixed thereon and extended rearwardly from the upper track 109, as shown in FIG. 17, and offset from the adjacent drive sprocket 107.

Three idler sprockets 125 are mounted for rotational movement on the sprocket mounting plate 112 of the first and second conveyors 105 and 106 facing inwardly of the main frame 30 and arranged in the spacial relationship shown in FIG. 9. As can best be seen in FIGS. 13 and 14, a restraining chain passage 126 is provided in the upper track 109 of the first and second conveyors 105 and 106 respectively at predetermined corresponding positions above the adjacent sprockets 125. Fastened on each upper track adjoining its respective passage adjacent to the front portion 31 of the main frame is a catch 127.

Figure 11:
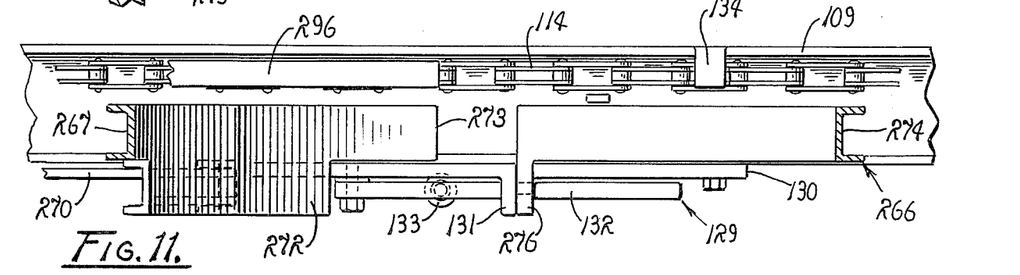
FIG. 11 is a fragmentary horizontal section taken from a position indicated by line 11—11 in FIG. 9.

A latch assembly 129 is mounted on the upper track 109 of the first and second conveyors 105 and 106 respectively in covering relation to the restraining chain passage 126, as best shown in FIG. 9. The latch assembly consists of a mounting plate 130 secured on the upper track of each conveyor extending across its respective restraining chain passage 126. The mounting plate has a stop 131 extended laterally therefrom in the predetermined position shown in FIGS. 11 and 12. A latch arm 132 is pivotally mounted on the mounting plate and resiliently urged into a raised position against the stop by a spring assembly 133 borne by the mounting plate. A pusher stop 134, shown in FIG. 11, is affixed on the upper track of each conveyor at the front portion 31 of the main frame 30 in the path of travel of the pusher arm to act as an absolute limit for advancement of the arm.

A restraining chain release assembly 140 is mounted on the sprocket mounting plate 112 of each conveyor 105 and 106 respectively, as shown in FIG. 9 with respect to conveyor 105. The release assembly includes a guide pin 141 extended outwardly from the sprocket mounting plate toward the interior of the main frame 30 in a predetermined position adjacent to the rearwardmost idler sprocket 125. An arcuate cam member 142 is extended from the sprocket mounting plate in a predetermined position under the same idler sprocket and rearwardly of the guide pin. A release arm 143, having an angled cam way 144 centrally thereof a remote end 145 and a mounting end 146, is mounted on the guide pin with the pin extended through the cam way 144 thereof. A cam roller 147 is secured on the mounting end 146 of the release arm in rolling engagement with the cam member 142. A pneumatic cylinder 148 interconnects the adjacent frame member 111 and the mounting end 146 of the release arm 143, as best shown in FIG. 9. As will subsequently be seen, extension of the pneumatic cylinder operates to position the remote end of the release arm in a predetermined position for purposes subsequently to be described.

A slack control assembly 155 is mounted on each conveyor 105 and 106, as best shown in FIGS. 1, 5, 9 and 18. The assembly consists of a track 156 secured on the underside of the upper track 109 of each conveyor and extending therealong. A carrier 157 is slidably received on the track 156 extending downwardly therefrom as best shown in FIG. 5. A take up sprocket 158 is rotationally secured on the carrier in the vertical plane defined by the three idler sprockets 125 of each conveyor. A cylinder mount 159 is affixed to each conveyor at the corresponding positions, as shown in FIG. 1 with respect to conveyor 105. A pneumatic cylinder 160 is mounted on the cylinder mount of each conveyor and connected to the carrier 157 extending longitudinally thereof.

Figures 12, 13:
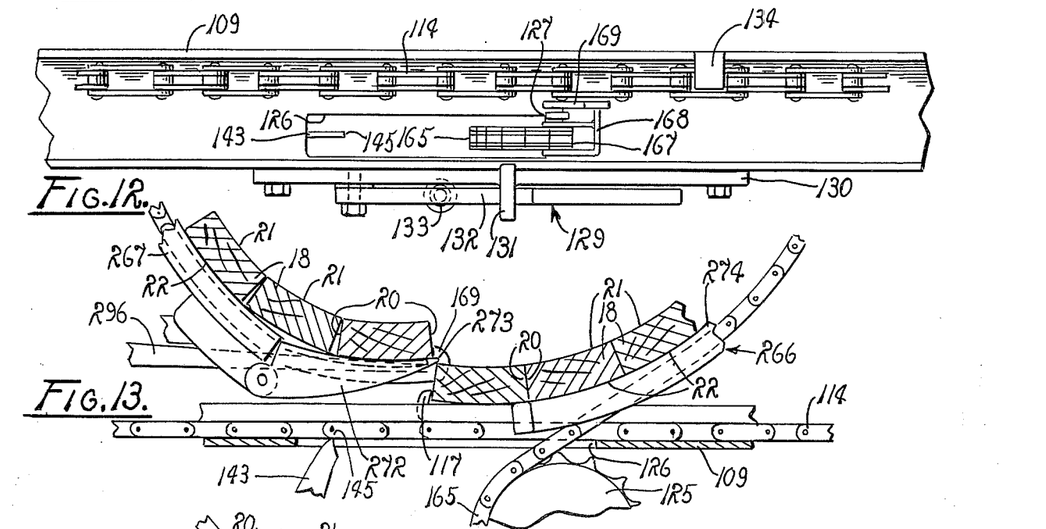
FIG. 12 is a fragmentary horizontal section of the portion of the machine viewed in FIG. 11, but with a portion of a guide frame of the machine removed from view.
FIG. 13 is a fragmentary transverse vertical section of the portion of the machine viewed in FIGS. 11 and 12 showing several of the segments in one stage of assembly.

A restraining chain 165, having a connection end 166 and a remote end 167, is mounted on each conveyor 105 and 106 respectively as schematically illustrated in FIG. 18. The connection end 166 is fastened on the conveyor chain 114 at the predetermined position relative to the pusher arm 116 shown in FIG. 18. A lateral extension 168 is secured on the remote end of the restraining chain mounting a hook 169 extending laterally thereof in spaced relation to the chain as best shown in FIGS. 12, 15 and 16. The restraining chain is extended from its point of connection to the conveyor chain 114, along the upper track 109 in side-by-side relation to the chain 114, about the rearwardmost idler sprocket 125 toward the rear portion 32 of the main frame 30, about the take up sprocket 158 of the slack control assembly 155, forward in the lower track 110 and then upwardly about and between the forwardmost idler sprockets 125, as best shown in FIG. 9. The remote end of the restraining chain is extended through the restraining chain passage 126 of the upper track in side-by-side relation to the conveyor chain 114 and with the lateral extension 168 engaging the catch 127 to retain the hook 169 in the elevated attitude shown in FIG. 16. As will subsequently be described, the restraining chain is adapted to be motivated between a retracted position shown in FIGS. 1, 9 and 18 and an advanced position shown fragmentarily in FIG. 14.

A segment or stave control mechanism 175 is mounted on each conveyor 105 and 106 respectively, as best shown in FIG. 5. Each of the control mechanisms includes a plurality of mounting plates 176 mounted on the conveyor frame 108 in upwardly extending relation. An angle iron guide 177 is pivotally mounted on the mounting plates of each conveyor extending longitudinally thereof and pivotal to and from a position in overlapping or overhanging relation to its respective upper track 109, as best shown in FIG. 5. A linkage 178 interconnects the guide with one of the mounting plates. A cylinder mount 179 is secured on the conveyor frame below the linkage 178. A pneumatic cylinder 180 operably interconnects the cylinder mount and the linkage operable by extension and contraction to pivot the guide to and from the overhanging position described.

An adjustment assembly is generally indicated by the numeral 190 in FIG. 1. The adjustment assembly includes a pair of bearing mounts 191 individually mounted on the longitudinal I beam 41 of the first sub frame 33. A pair of bearings 192 are individually secured on the bearing mounts. A pair of internally screw-threaded sleeves 193 are individually mounted on the longitudinal I beam 71 of the second sub frame 34 in axial alignment with their corresponding bearings 192, as best shown in FIGS. 4 and 5. A pair of adjustment shafts 194, having drive end portions 195, are individually rotationally received in the corresponding axially aligned pairs of bearings and sleeves. A pair of sprockets 196 are individually fastened on the end portions of the adjustment shafts beneath the first conveyor 105 and interconnected in driving relation by a drive chain 197. A crank mechanism 198 is mounted on the first component 52 of the first guide frame support structure 51, as shown in FIGS. 1 and 3. A pair of sprockets 199 are individually secured on the drive end portion 195 of the adjustment shaft 194 adjacent the front portion 31 of the main frame 30 and on the crank mechanism and interconnected by a drive chain 200. Thus, operation of the crank mechanism causes the adjustment shafts 194 to be rotated to move the second sub frame 34 and the elements borne thereby toward and from the first sub frame 33 along the pair of transverse I beams 40.

A drive motor 205 is mounted on the motor platform 57. A reversible, three horse power, single phase, electric motor has been found to have satisfactory operational characteristics, but, of course, the motor can be of any suitable type. The motor is connected in driving relation to the drive end portion 103 of the drive shaft 102 by a drive linkage 206.

A flange mounting assembly is generally indicated by the numeral 215 mounted on the first flange support structure 46 and the second flange support structure 77. As shown best in FIG. 6, the flange mounting assemblies are virtually identical except that they are substantially mirror images of each other. The assemblies are arranged to face toward each other in axial alignment transversely of the machine. For descriptive convenience the assemblies are described simultaneously.

Figure 10:
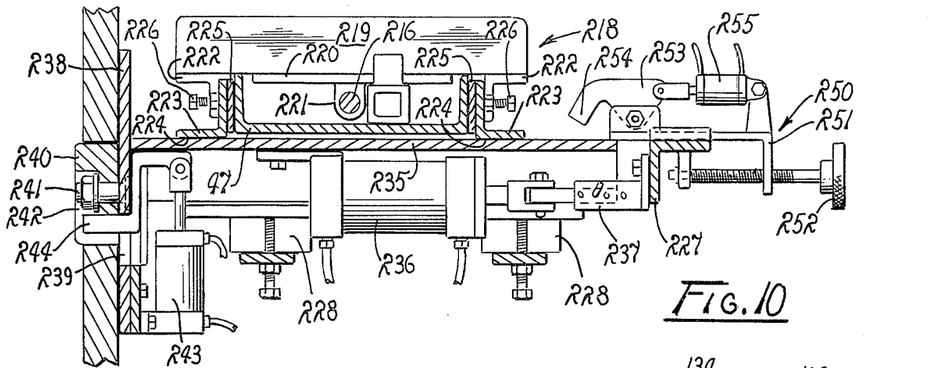
FIG. 10 is a fragmentary horizontal section of a flange retaining portion of the machine.

Each of the assemblies 215 includes a vertical adjustment shaft 216 journaled in the bearings 50 and 81 respectively of the first and second flange support structures 46 and 77 respectively. Each adjustment shaft mounts a crank 217 at the upper end thereof. As shown in FIGS. 9 and 10, each mounting assembly further includes a mounting frame 218 composed of a pair of back plates 219 on which is secured a sleeve mount 220 received within the upright beams 47 and 78 respectively of the support structures 46 and 77 respectively. An internally screw-threaded sleeve 221 is mounted on the sleeve mount with the adjustment shaft 216 of that mounting assembly screw-threadably received in the sleeve. The back plates 219 are interconnected at the opposite ends thereof by a pair of angle brackets 222 overlapping the sides of their respective upright beam and individually mounting an angle guide 223. The angle iron guides have machined guide surfaces 224 facing in the direction of the front portion 31 of the main frame 30. Suitable compression pads 225 are disposed between the angle iron guides and the sides of the upright beam and lock bolts 226 are individually extended through the brackets and guides for locking engagement with the compression pads to assist in supporting the mounting frame 218 of each mounting assembly on its respective upright beam.

A guide frame 227 is mounted on each mounting frame 218 on the angle iron guides 223, as best shown in FIG. 6. Each guide frame has four guide brackets 228 aligned to define a path for movement substantially normal to its respective upright beam, but in a plane substantially parallel to the upright beam.

A slide member 235 is slidably received in the guide brackets 228 of each of the guide frames 227 for movement toward and from the center of the main frame 30, as best shown in FIG. 6. A pneumatic cylinder 236 is secured on the slide member and is connected to the guide frame 227 by an endwardly adjustable connection 237. Thus, it will be seen that expansion and contraction of the pneumatic cylinder causes the slide member to move within the guide frame. A flange plate 238 is borne by the slide member in substantially right-angular relation thereto on an end thereof adjacent the interior of the machine 10. The flange plate has a rectangular passage 239 therein in a predetermined position, as shown in FIG. 9. A flange locking projection 240 is affixed on the flange plate substantially centrally thereof by a nut and bolt assembly 241 extending toward the interior of the machine. The locking projection has a notch 242 therein communicating in overlaying relation with the rectangular passage of the flange plate, as best shown in FIG. 9. A pneumatic cylinder 243 is mounted on the flange plate on the opposite side thereof from the locking projection, as best shown in FIG. 10. The pneumatic cylinder has a binding arm 244 extending through the rectangular passage 239 and notch 242 and movable by the pneumatic cylinder within the notch for binding engagement with the flange portion 12 of a reel 11.

Each of the flange mounting assemblies 215 includes an adjustment assembly 250, shown in FIG. 10. Each adjustment assembly consists of a slide plate 251 mounted on the guide frame 227, as shown in FIG. 10, for slidable movement toward and from the mounting frame 218 thereof. An adjustment shaft 252 adjustably interconnects the guide frame 227 and the slide plate for screw-threaded adjustment of the slide plate relative to the guide frame. A lever arm 253 is pivotally borne by the slide plate and has a remote end 254. A pneumatic cylinder 255 is mounted on the slide plate and connected to the lever arm for pivotal movement thereof upon expansion or contraction of the cylinder.

An orienting station or a guide frame assembly 265 is individually mounted on each of the guide frame support structures 51 and 82 respectively. Since the assemblies 265 are substantially identical, they will be simultaneously described. Each of the guide frame assemblies includes a substantially circular guide frame 266. The guide frame is composed of a rear track 267 having pivotal connections 268 at the opposite ends thereof. The rear track is mounted on the machine by an upper strap 269 interconnecting the rear track with the mounting plates 56 and 87 respectively of the guide frame support structures. A rear strap 270 interconnects the opposite end of the rear track with the forward end portion 53 and 84 respectively of the first components 52 and 83, as best shown in FIG. 9. Thus, each of the guide frames 266 is mounted in position on the machine by only two connections permitting easy removal from the machine. A hook 271 is fastened in a position on the upper strap 269 extending toward the front portion 31 of the main frame 30.

An arcuate gate 272 is pivotally mounted on the pivotal connection 268 of the rear track 267 adjacent to the upper track 109 of the first and second conveyors 105 and 106 respectively. Thus, the gate is pivotal from the lowered position shown in FIG. 9 to a raised position shown in FIG. 13 and has a forward end 273. Each guide frame 266 has a front track 274 pivotally mounted on the pivotal connection 268 of the rear track 267 remote from the gate. Thus, the front track is pivotal on the rear track between a lowered position shown in FIG. 9 completing the circular configuration of the guide frame 266 to a raised position shown in dashed lines in FIG. 9. A catch 275 is borne by the front track for engagement with the hook 271 to retain the front track in the raised position shown in FIG. 9. The remote end of the front track has a stop 276 which abuttably engages the stop 131 of the latch assembly 129 when a front track is in the lowered position. Thus, as best shown in FIG. 11, the latch arm 132 of the latch assembly captures the stop 276 of the front track in releasible engagement with the stop 131 to retain the front track in the lowered position forming the circular configuration for the guide frame 266. As can be seen in FIGS. 9 and 11 through 14, the point of engagement of the stops 131 and 276 is spaced approximately the width of one stave 18 of a reel 11 from the forward end 273 of gate 272. Similarly, the flange mounting assemblies 215 and the guide frame assemblies 265 are disposed at angles with respect to true vertical, for purposes subsequently to be described.

It will become apparent that the machine 10 of the present invention would relatively easily be adaptable for operation manually, semi-automatically or nearly fully automatically by a variety of types of control systems. However, it has been found that the machine operates efficiently when operated semi-automatically thereby providing rapid operation with an abundance of control.

A suitable control system for semi-automatic operation of the machine 10 is schematically illustrated in FIG. 20 and generally represented by the numeral 290 therein. As shown in FIG. 20, a control housing is represented generally at 291. The control housing can, of course, be mounted at any suitable location such as directly on or adjacent to the machine. The control housing is operably connected to an electrical system 292 of the control system 290.

The electrical system 292 has a start and stop switch 293 mounted within the control housing and connected to a suitable source of electrical energy, such as for example a source of 110 volts. Also mounted in the housing adjoining the start switch are a forward switch 294 and reverse switch 295. A front lever arm assembly 296 is mounted for pivotal movement on the forward end portion 53 of the first component 52 of the first guide frame support structure 51 in side-by-side relation to the arcuate gate 272 thereof on the first sub frame 33, as best shown in FIG. 9. The lever arm assembly is operably connected to a microswitch 297 mounted on the second component 54 of the first guide frame support structure. Similarly, a rear lever arm assembly 298 is pivotally mounted on mounting plate 121 on the first sub frame 33 at the rear portion 32 of the main frame 30. The rear lever arm assembly is mounted in position for operable engagement with a microswitch 299 borne by the mounting plate 121, as best shown in FIG. 17. The lever arm assembly is positioned for engagement by the connection end 166 of the restraining chain 165 of the first conveyor 105 when it reaches its fully retracted position to trip the microswitch 299.

The forward switch 294 is operably connected to the drive motor 205 by electrical conductor 300. Microswitch 297 is operably connected with the forward switch by electrical conductor 301 to terminate the flow of current therethrough upon operation of lever arm assembly 296. The reverse switch 295 is operably connected to the drive motor 205 by electrical conductor 302. Microswitch 299 is operably connected to the start and stop switch 293 by electrical conductor 304 adapted to terminate the flow of electrical current through the start and stop switch upon operation of the rear lever arm assembly 298.

Five pneumatic control valves 310 are mounted in the control housing 291. The control valves are connected to an inlet conduit 311 which is adapted to be connected to a source of air under pressure. Each of the control valves is connected by a system of air conduits 312 to a selected pair of the pneumatic cylinders 148, 160, 180, 236, 243 and 255. Each valve is connected to its respective pair of pneumatic cylinders by its respective system of air conduits which are connected in the conventional manner to connect the cylinders to the valve in parallel. Thus, operation of a selected valve will operate its pair of pneumatic cylinders simultaneously. Therefore, operations on the first and second sub frames 33 and 34 respectively are performed upon operation of the specific control valve involved. Thus, for example, operation of the control valve connected to the pneumatic cylinders 160 of the slack control assembly 155 simultaneously extend or retract those pneumatic cylinders corresponding distances as controlled by the single valve.

A forward control valve 313 is mounted at a suitable location on the front portion 31 of the main frame. The valve is connected to the air inlet conduit 311 and the air conduits 312 interconnecting the pair of cylinders 243 by an air conduit system, as shown in FIG. 20, so as to permit operation to cause simultaneous contraction of the cylinders 243 for binding of flanges on the flange mounting assemblies. The valve is not operable to release the flanges. This operation must be performed by operating the associated valve 310 on the control housing.

OPERATION

The operation of the described embodiment of the subject invention is believed to be clearly apparent and is briefly summarized at this point. The machine 10 is in a ready position when arranged as shown in FIGS. 1, 2 and 3. In this arrangement the conveyor chain 114 and the restraining chain 165 are motivated to their retracted positions with the connection end 166 of the restraining chain in engagement with the rear lever arm assembly 298, as shown in FIG. 17. Thus, the hook 169 is disposed in the retracted "ready" position shown in FIG. 16 with the lateral extension 168 engaging the catch 127.

At this time the front tracks 274 of the guide frame assemblies 265 are positioned in the lowered positions so as to form the completed circular guide frames 266 with the stops 276 captured by the latch assemblies 129, as shown in FIG. 9 with respect to the first sub frame 33. The stave control mechanism 175 is at this time operated through operation of pneumatic cylinders 180 to rotate the angle iron guides 177 away from their positions in overhanging relation to their respective conveyors 105 and 106 respectively to open positions in receiving relation to the staves.

As can best be visualized in FIG. 3, the conveyor assembly 100 is then loaded with a predetermined number of staves 18 extending transversely of the conveyor assembly in rested relation on the upper tracks 109 of the first and second conveyors 105 and 106 respectively in front of the pusher arms 116 of the conveyors. The staves are positioned, as shown in FIG. 8, with the convex surfaces 22 thereof in engagement with the upper tracks 109. It will be apparent that the number of staves positioned on the conveyor assembly will be controlled by the diameter of the cylindrical portion 13 of the reel 11 to be formed by the machine. Thus, it will be seen that widths of the convex surfaces 22 of the predetermined number of staves, in total, will approximately correspond to the inside circumference of the guide frames 266. In practice, however, it is frequently necessary longitudinally to sever one of the staves so that the total of their widths is precisely as desired.

Subsequently the stave control assembly 175 is operated by activation of the pneumatic cylinders 180 through the appropriate control valve 310 and air conduits 312 to rotate the angle iron guides 177 to their closed positions. The guides are thus positioned to overhang their respective conveyors 105 and 106 to form upper and lateral restraints against displacement of the staves from the conveyor assembly.

The flange portions 12 of the reel 11 to be formed are preferably individually mounted on the flange mounting assemblies 215 of the first and second sub frames 33 and 34 prior to operation of the conveyor assembly 100. As can be visualized in FIG. 6, each of the flange mounting assemblies is operated to retract its slide member 235 and thus the flange plates 238 borne thereby to fully retracted position. This is accomplished by operating the appropriate control valve 310 to contract the pneumatic cylinder 236 of each mounting assembly to motivate the slide member 235 outwardly from the center of the machine 10. Similarly, the pneumatic cylinder 243 of each assembly 215 is, at this time, operated to position its binding arm 244 in the fully retracted position within the rectangular passage 239 and notch 242, as shown in FIG. 10.

A pair of flange portions 12 for the reel 11 to be assembled are individually positioned with the locking projection 240 of its respective assembly 215 inserted through the retaining opening 15 thereof and pressed backwardly against the flange plate 238. The flange portions are oriented so that grooves 17 thereof face inwardly toward each other and the patterns of bolt holes 16 are in corresponding, aligned positions. Subsequently, the pneumatic cylinder 243 of each assembly is operated through the appropriate control valve 310 to contract the cylinder so as to press the binding arm 244 into engagement with the flange thereby locking the flanges in position on the assemblies. For convenience, the forward control valve 313 can be employed so as to operate the pneumatic cylinders 243 through the air conduit system 314 after the operator has properly positioned the flange portions. Thus, the machine can be operated by a single operator.

The pneumatic cylinder 255 is operated, by its appropriate control valve 310 to rotate the lever arm 253 so as to position its remote end 254 in a lowered position. Subsequently, the pneumatic cylinder 236 is expanded, by operation of the appropriate control valve 310, to motivate its respective flange plate 238 into an "intermediate" position controlled by engagement of the remote end of the lever arm with the edge of the adjacent guide 223. It will be seen that the adjustment shaft 252 can be employed in advance of this operation to control the precise location for the "intermediate" position. At this point, the operator of the machine inserts bolt and nut assemblies 23 through the bolt holes 16 of the flange portions 12 mounted on the flange mounting assemblies 215 thereby interconnecting the flange portions The bolt and nut assemblies, however, are not tightened down but are simply loosely received in the bolt holes 16 for subsequent use.

The conveyor assembly 100 is then activated by the operator pressing the start and stop switch 293 to provide power for the machine 10. Subsequently, the forward switch 294 is operated by the operator to supply power to the drive motor 205 which in turn rotates the drive shaft 102 by way of drive linkage 206. The conveyor chains 114 of the respective first and second conveyors 105 and 106 are thus driven in a counterclockwise direction, as viewed in FIG. 1, to carry the pusher arms 116. Thus, the predetermined number of staves 18 are transported along the upper tracks 109 of the conveyors by the pusher arms toward the front portion 31 of the main frame 30. It will be seen that during such movement the stave control assembly 175 operates to prevent displacement of the staves from their arranged position on the conveyors during such transport toward the front portion of the main frame.

As can best be visualized in FIG. 18, the movement of the conveyor chains 114 operate simultaneously to carry the restraining chains 165 by their connection ends 166 toward the front portion 31 of the main frame 30. During this time period the pneumatic cylinders 160 are operated, through appropriate control valve 310, to contract so as to draw the take up sprockets 158 toward the rear portion 32 of the main frame thereby taking up the slack created by movement of the restraining chain. Since the slack is taken up in the manner described, the hook 169 is retained in the previously described position shown in FIGS. 1, 2 and 16.

When the stave 18 nearest the front portion 31 of the main frame 30, or in other words the first or leading stave, reaches the guide frames 266, it engages and pivots upwardly the arcuate gates 272 to gain admission to the interior of the guide frames as can be most easily seen in FIG. 13. Thereafter, the leading stave engages the hooks 169 of the restraining chains 165, as shown in dashed lines in FIG. 9, and acts to carry the hooks and remote ends 167 of the restraining chains about the front tracks 274 of the guide frames. It will be seen that the restraining chains are carried about the exteriors of their respective guide frames with the hooks thereof engaged by the staves laterally thereof. When the lead stave contacts the hooks, the contraction of the pneumatic cylinders 160 is continued at a predetermined rate to exert sufficient restraint against movement of the hooks 169 with the staves.

The staves 18 are thus captured between the pusher arms 116 of the conveyors 105 and 106 and the hooks 169 of the restraining chains 165 thereby maintaining the staves in side-by-side abutted engagement during movement into the guide frames 266. When the leading stave begins its travel up the arcuate interior of the front tracks 274, the stave is tilted to position its rearwardmost opposite side 20 into engagement with the forwardmost opposite side of the adjacent stave. This occurs successively with the remaining staves during transport of the staves as a unit about the interior of the guide frames. The facing side engagement of the staves and the resistance of the hooks 169 to transport, acts to maintain the staves in the side-by-side abutted relationship so as to cause them to travel about the interior of the guide frame from the front tracks 274 to the rear tracks 267 restrained against gravitational displacement to form the cylindrical configuration for the cylindrical portion 13 of the reel.

Figure 14:
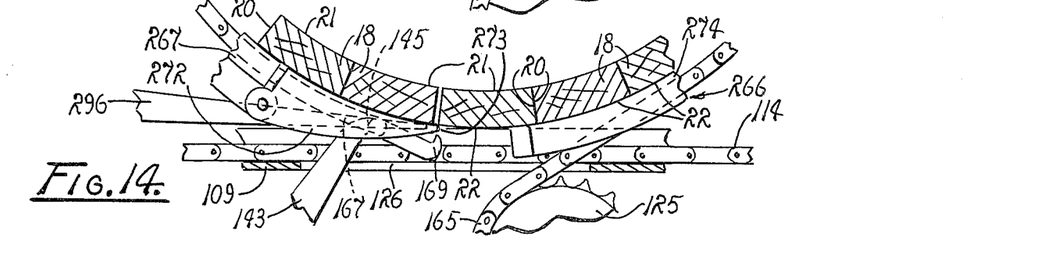
FIG. 14 is a fragmentary transverse vertical section taken from the same position shown in FIG. 13, but showing the segments having assumed a portion of the preselected configuration.

As can be seen in FIGS. 13 and 14, the arcuate gates 272 are maintained in the raised positions during transport of the staves 18 under the gates and into the interior of the guide frames 266. Thus, when the leading stave has been carried about the interior of the guide frames and reaches the interior of the gate it is oriented as shown in FIG. 13. When the trailing or last stave is carried through the gates by the pusher arms 116, the gates pivot gravitationally into the closed position shown in FIG. 14 thereby automatically positioning the leading stave in side-by-side abutted engagement with the last stave, as shown in FIG. 14. As can be seen in FIGS. 13 and 14, the plane defined by the upper tracks meets the upward sloping interior surfaces of the front tracks at points spaced from the forward ends 273 of the gates a distance approximately equal to the individual widths of the staves. Consequently, the trailing stave is still engaged by the hook's pusher arm 116 when the leading stave is dropped into juxtaposition with the trailing stave. Thus, the staves remain captured between the arms 116 and hooks 169 while the staves assume the cylindrical configuration. Therefore, the staves are restrained against gravitational displacement during movement within the guide frames by abutted side-by-side engagement maintained by the guide arms and hooks.

As can also best be seen in FIGS. 13 and 14, the downward movement of the leading stave into position against the trailing stave causes it to engage and move downwardly the front lever arm assembly 296 so as to operate its microswitch 297 thereby terminating the flow of current through the electrical system 292 by way of the forward switch 294. Thus, the moment the cylindrical portion 13 is formed, the machine 10 is automatically shut off to stop movement of the conveyors 105 and 106 and restraining chains 165. If, however, a malfunction occurs, the pusher stops 134 when engaged by the pusher arms 116 will terminate such movement of the conveyors.

The flanges 12 are positioned in engagement with the opposite ends 19 of the staves 18 forming the cylindrical portion of the reel 11 by operation of the control valve 310 to expand the pneumatic cylinders 236. The slide members 235 are motivated toward each other to position their respective flange plates 238 in the fully advanced positions. Such action motivates the flange portions 12 borne thereby toward the assembled cylindrical portion 13 formed by the staves 18 whereby the opposite ends 19 of the staves are fully received within the circular grooves 17 of the flange portions. Subsequently, the bolt and nut assemblies 23 are simply tightened down to retain the flange portions in the assembled engagement with the cylindrical portion 13 of the reel 11.

Subsequently, the appropriate control valve 310 is operated to release pneumatic pressure within the cylinders 160. Thereafter, the operator employs the appropriate control valve 310 to expand the pneumatic cylinders 148 thereby causing the remote ends 145 of the release arms 143 to move upwardly from the position shown in FIG. 13 to the position shown in FIG. 14 to engage the remote ends 167 of the restraining chains 165 urging them slightly forwardly and permitting the hooks 169 to drop gravitationally from engagement with the leading stave. The restraining chains are thus disengaged from the staves. The operator can manually draw the restraining chains from about their respective guide frames 266 to permit opening of the guide frames. The free portions of the chains are simply deposited in their respective chain boxes 119 from which they will be drawn during retraction of the restraining chains to the retracted positions, shown in FIGS. 1 and 2.

The latch arms 132 of the latch assemblies 129 are pressed downwardly by the operator to release the stops 276 of the front tracks 274 from restraint. The front tracks are then pivoted upwardly to positions corresponding to that shown in dashed lines in FIG. 9. The front tracks are retained in this position by receipt of their catches 275 in their respective hooks 271. Subsequently, the operator, utilizing the appropriate control valve 310, extends the pneumatic cylinders 243 to retract the binding arms 244 into the notches 242 of the locking projections 240 so as to release the binding arms from engagement with the flange portions 12.

Subsequently, the pneumatic cylinders 236 are again operated, through the appropriate control valve 310, to move the flange plates 238 to the fully retracted positions thus drawing the locking projections 240 from the retaining openings 15 of the flange portions 12 of the reel 11. Thereafter, the assembled reel is removed from the machine by simply rolling it along the upper tracks 109 of the first and second conveyors 105 and 106 respectively and rolling it down the ramps 120.

The operator then presses the reverse switch 295 to cause the motor 205 to operate in a reverse direction thereby rotating the drive shaft 102 in a reverse direction and causing the conveyors 105 and 106 to move from the advanced positions to the retracted positions previously described. When the conveyors reach the retracted positions, the connection end 166 of the restraining chain 165 of the first conveyor engages the rear lever arm assembly 298 to activate its microswitch 299 to terminate the flow of power through the start and stop switch 293 thereby shutting off the motor 205.

As previously noted, the machine 10 is fully adjustable to handle the assembly of reels of varying sizes and proportions. Such adjustment is expeditiously accomplished without major overhaul of the machine. Expansion of the conveyor assembly 100 to accommodate staves 18 of different lengths is accomplished by operation of the adjustment assembly 190. The operator simply operates the crank mechanism 198 driving the adjustment shafts 194 to urge the second sub frame 34 toward or from the first sub frame 33. Thus, the second sub frame is transported in slidable movement along the pair of transverse I beams 40 of the first sub frame on its transverse I beams 70. Since the conveyors 105 and 106 are of independent construction, such adjustment requires no disassembly of integrated units. Since the second conveyor 106 is connected to the drive shaft 102 through a keyed drive sleeve 104, adjustment is permitted along the drive shaft without danger of scoring the drive shaft.

The flange mounting assemblies 215 are readily adjusted on their respective flange support structures 46 and 77 to accommodate flange portions 12 of a different diameter. Such adjustment is accomplished by loosening the lock bolts 226 and operating the cranks 217 so as to rotate the adjustment shafts 216 to raise or lower the mounting frames 218 borne thereon. When the desired elevation is reached, the lock bolts 226 are again tightened down to secure the mounting frames in the selected positions.

As previously described, the adjustment assemblies 250 can be readily adjusted, utilizing the slide plates 251 and adjustment shafts 252, to reposition the lever arm to redefine the "intermediate" position for the flange plates 238 so as to accommodate cylindrical portions 13 of reels of different lengths.

Similarly, the guide frame assemblies 265 are readily replaced to permit the formation of cylindrical portions 13 of different diameters. The guide frame assemblies are removed simply by disconnecting their respective upper straps 269 and rear straps 270 from the guide frame support structures 51 and 82. The assemblies are then easily replaced with guide frame assemblies having guide frames 266 of a different selected diameter.

The present invention provides a machine which is adapted to assemble structures, such as reels, composed of a plurality of segments with only a minimum of manual assistance far more rapidly than has heretofore been possible thereby significantly reducing the cost per unit and rapidly expanding the output capability, the machine being expeditiously adjustable for the assembly of structures of varying sizes and proportions without major overhaul providing a commercially acceptable flexibility of operation.

Although the invention has been herein shown and described in what is conceived to be the most practical and preferred embodiment, it is recognized that departures may be made therefrom within the scope of the invention, which is not to be limited to the illustrative details disclosed.

I claim:

1. A machine for arranging a plurality of articles, disposed in abutted series relation defining a leading article and a trailing article, in a substantially cylindrical configuration and the articles have surfaces formed facingly to engage the corresponding surfaces of adjacent articles in said configuration, the machine comprising guide means having a substantially circular frame defining the substantially cylindrical configuration oriented about a substantially horizontal axis for guiding said surfaces of the articles into facing engagement during arranging of the articles in said configuration resisting gravitational displacement of the articles from said configuration and the guide means having a portion thereof pivotal inwardly of the frame to form an article admitting passage; means associated with the guide means for engaging the trailing article and conveying said articles in the guide means into said configuration, and said conveying means defines a substantially horizontal plane substantially tangent to the interior of the circular frame at a point spaced from the pivotal portion of the frame a distance sufficient to have the trailing article still engaged by the conveying means when received within the frame maintaining said abutted series relation of the articles and the pivotal portion of the frame is substantially simultaneously gravitationally pivotal downwardly subsequent to passage of the trailing article therethrough to position the leading article, then rested thereon, in side-by-side relation with said trailing article to complete the substantially cylindrical configuration forming a contiguous unit restrained against gravitational displacement within the frame; and means for engaging the leading article to resist conveyance of the articles in the guide means to retain said articles in the abutted series relation in the guide means.

2. The machine of claim 1 wherein the conveying means is driven by a drive means and a switch mechanism is operably connected to the drive means and disposed to be tripped during positioning of the leading article in said side-by-side relation with the trailing article to terminate operation of the drive means.

3. A machine for assembling reels which have primarily a pair of substantially flat flange portions interconnected by a substantially cylindrical portion consisting of a plurality of segments extended longitudinally of the cylindrical portion, the machine comprising a main frame; a conveyor assembly, adapted to receive said segments in side-by-side relation thereon, mounted on the main frame and having a pusher adapted for movement to and from predetermined retracted and advanced positions; a pair of guide frames mounted on the main frame in substantially coaxial alignment defining a substantially cylindrical configuration extending transversely of the conveyor assembly adjacent to the advanced position of the pusher; means for admitting said segments to the interior of the guide frames dimensioned to receive all of said segments within the guide frames substantially simultaneously with the pusher reaching the advanced position; means for retaining said segments in side-by-side relation and in engagement with the guide frames during movement therewithin to cause the segments to assume the substantially cylindrical configuration of the guide frames; and means for individually mounting said flange portions in substantially coaxial alignment with and individually outwardly of respective guide frames for movement to and from advanced positions in juxtaposition to their respective guide frames to mount said flange portions on the segments.

4. The machine of claim 3 wherein the retaining means includes a pair of restraining chains individually mounted for movement on the guide frames, each chain having an end portion mounting a hook adjacent to one of the guide frames in a ready position for engagement by said segments upon admission to the guide frames, said chains being adapted to be carried by the segments in circumscribing relation to their respective guide frames as the segments assume the substantially cylindrical configuration so as to capture the segments between the pusher and hooks resisting gravitational displacement of the segments from said configuration.

5. The machine of claim 4 wherein the restraining chains have ends connected to the conveyor assembly at corresponding positions remote from the guide frames and means are mounted on the main frame in connection with the chains for taking up slack in the chains during movement of the pusher to the advanced position until the segments contact the hooks and thereafter to offer controlled resistance to movement of the chains and thus the segments within the guide frames to maintain said segments in engagement with the guide frames.

6. The machine of claim 5 wherein the end portion of each chain mounting the hook reaches an extended position substantially beneath its respective guide frame when the segments have assumed the cylindrical configuration and release arms are individually mounted on the main frame beneath each guide frame and are positionable to engage the end portions of their respective chains to urge the hooks borne thereby away from the segment engaged thereby gravitationally to release the hooks from the segment whereby said take up means can be operated to retract the chains and their hooks to said ready positions.

7. The machine of claim 6 wherein said segment admitting means is an arcuate gate borne by each guide frame substantially juxtaposed the extended position of its respective chain and hook gravitationally retained in a normal lowered position and pivotal inwardly of its respective guide frame to admit the segments while gravitationally resting thereon.

8. The machine of claim 7 wherein the segments are arranged on the conveyor assembly presenting first and last segments with respect to the direction of travel to the advanced position of the pusher and the gates form portions of their respective circular guide frames and said gates have forward ends disposed a distance rearwardly of the advanced position of the pusher sufficient to permit said gates to drop downwardly into their normal positions when the last segment has been transported through the gates and the first segment is rested on the gates thereby positioning the first and last segments in side-by-side relation and completing the substantially cylindrical configuration of said segments.

9. The machine of claim 8 wherein the conveyor assembly is driven by a drive motor operated by a control system and a trip arm is mounted on the main frame in connection with the control system operable to terminate operation of the drive controlling relation to the power means and motor through said control system, said arm extending laterally adjacent to one of the gates in position to be tripped by the first segment when dropped into side-by-side relation to the last segment by the gate.

10. The machine of claim 9 wherein the flange portion mounting means includes a pair of flange portion retaining assemblies individually mounted on the main frame in substantially coaxial alignment with the guide frames with said guide frames disposed therebetween, each of said assemblies having power means adapted to motivate a flange portion borne thereby toward and from its adjacent guide frame from a retracted position for mounting and removal of said flange portion, an intermediate position for interconnection of a pair of flange portions individually borne by the assemblies by bolts and an advanced position for endward engagement of the flange portion with said segments assembled in said substantially cylindrical configuration.

11. The machine of claim 10 wherein each flange portion has a central passage and each retaining assembly has a locking projection for insertion through the passage of a flange portion to be retained thereon and a binding arm borne by the locking projection movable radially by the retaining assembly into binding engagement with a flange portion borne by the projection.

12. The machine of claim 11 wherein the main frame is composed of a pair of sub frames each mounting a guide frame, a flange portion retaining assembly, and a longitudinal half of the conveyor assembly and a mechanism is borne by the main frame for motivating said sub frames toward and from each other to adjust said sub frames for the assembly of reels of different widths.

13. The machine of claim 12 wherein a crank assembly is journaled in each sub frame in elevationally adjustable engagement with each flange retaining assembly to adjust the machine for the assembly of reels of different diameters.

14. The machine of claim 13 wherein the guide frames are removable from their respective sub frames for replacement by guide frames of different sizes to permit adjustment for the assembly of reels having cylindrical portions of different diameters.

15. The machine of claim 14 wherein each half of the conveyor assembly mounts a segment control mechanism intermediate the retracted and advanced positions operable to overlap segments positioned in side-by-side relation on the conveyor assembly to preclude their displacement during conveyance between said retracted and advanced positions.

16. A machine for arranging a plurality of articles, disposed in abutted series relation defining a leading article and a trailing article, in a preselected configuration and having surfaces formed facingly to engage the corresponding surfaces of adjacent articles in the preselected configuration, the machine comprising guide means including a substantially circular frame having a portion thereof pivotal inwardly of the frame to form an article admitting passage; conveying means, defining a substantially horizontal plane substantially tangent to the interior of the circular frame at a point spaced from the pivotal portion of the frame a predetermined distance, for engaging the trailing article and conveying said articles into the guide means through said article admitting passage and into said preselected configuration; and means for engaging the leading article to resist conveyance of the articles to retain the articles in said abutted series relation during conveyance by the conveying means about the interior of the frame and into said preselected configuration.

17. A machine for assembling structures composed of a plurality of segments disposed in a preselected configuration and united with members endwardly connected to the segments, the machine comprising a guide frame having a concave surface defining the preselected configuration; means associated with the guide frame for conveying said plurality of segments disposed in side-by-side abutting relation on to the concave surface of the guide frame while holding said segments in abutting relation to be guided by said guide frame into the preselected configuration; and means for conveying said members into endward engagement with the segments.

18. The machine of claim 17 wherein the segments are arranged so as to have leading and trailing segments and said segment conveying and holding means includes a pusher for engaging the trailing segment and powered for conveyance of the segments on to the surface of the guide frame and holding means for engaging the leading segment for resisting movement to capture the segments as a unit against the pusher for said conveyance.

19. A machine for arranging a plurality of articles, disposed in abutted series relation to provide a leading article and a trailing article, in a preselected configuration, the machine comprising a guide frame having a concave surface dimensioned and proportioned to define the preselected configuration; means associated with the guide frame for engaging the trailing article and conveying said articles along said surface and into the preselected configuration; and means for engaging the leading article and resisting conveyance of the articles in the guide frame to retain said articles in the abutted series relation on said surface.

20. The machine of claim 19 wherein the articles have surfaces formed for facing engagement with corresponding surfaces of adjacent articles in the preselected configuration and the guide means has a substantially arcuate configuration guiding said surfaces into facing engagement during conveyance into the preselected configuration resisting gravitational displacement of the articles from said preselected configuration.

21. The machine of claim 20 wherein the guide frame is substantially circular defining a substantially cylindrical configuration oriented about a substantially horizontal axis and having a portion thereof in alignment with the conveying means pivotal inwardly of the guide frame to form an article admitting passage.

22. The machine of claim 21 wherein the machine has a main frame and the guide frame is detachably mounted on the main frame to permit removal of the guide frame therefrom for replacement by a guide frame having a surface dimensioned and proportioned to define a configuration different from said preselected configuration.

23. A machine for assembling a multiplicity of elongated elements having opposite ends in side-by-side orientation circumscribing an axis and applying securing means to common ends of the elements in said orientation to secure said elements in such orientation comprising:

A. means defining a track having a receiving station adapted to receive said elements in side-by-side relation transversely of the track and an orientating station continuous with the receiving station and in circumscribing relation to said axis;

B. means for advancing said elements along the track from the receiving station to the orienting station at which said elements conform to the track and ends of the elements disposed in a common direction axially of the axis are accessible; and C. means for mounting the securing means on the accessible ends of the elements at the orienting station to secure said elements in assembled relation.

* * * * *

UNITED STATES PATENT AND TRADEMARK OFFICE
CERTIFICATE OF CORRECTION

PATENT NO. : 3,961,912
DATED : June 8, 1976
INVENTOR(S) : Roane C. Noel

It is certified that error appears in the above-identified patent and that said Letters Patent are hereby corrected as shown below:

Column 3, line 42, between "bers" and "flange" insert a comma.

Signed and Sealed this

Thirty-first Day of August 1976

[SEAL]

Attest:

RUTH C. MASON
*Attesting Officer*

C. MARSHALL DANN
*Commissioner of Patents and Trademarks*